United States Patent
Katsurahira (10) Patent No.: US 6,810,351 B2
(45) Date of Patent: Oct. 26, 2004

(54) POSITION DETECTOR (75) Inventor: Yuji Katsurahira, Kaza (JP)

(73) Assignee: Wacom Co. Ltd., Saitama (JP)

( * ) Notice: Subject to any disclaimer, the term of this patent is extended or adjusted under 35 U.S.C. 154(b) by 0 days.

(21) Appl. No.: 10/226,196

(22) Filed: Aug. 23, 2002

(65) Prior Publication Data

US 2004/0039545 A1 Feb. 26, 2004

(30) Foreign Application Priority Data

Aug. 24, 2001 (JP) ........................................ 2001-254453

(51) Int. Cl.$^7$ ............................. G01C 9/00; G06F 15/00
(52) U.S. Cl. ..................... 702/150; 702/155; 702/190; 702/199; 178/18.03; 178/19.03
(58) Field of Search ................................ 702/150, 151, 702/155, 168, 190, 199; 178/19.03, 19.04, 19.06, 18.03, 18.07

(56) References Cited

U.S. PATENT DOCUMENTS 4,878,553 A * 11/1989 Yamanami et al. ...... 178/18.07
4,948,926 A * 8/1990 Murakami et al. ....... 178/18.07
4,988,837 A * 1/1991 Murakami et al. ....... 178/18.07
5,763,839 A * 6/1998 Funahashi et al. .......... 177/147

* cited by examiner

Primary Examiner—Bryan Bui
(74) Attorney, Agent, or Firm—Liniak, Berenato & White, LLC (57) ABSTRACT A position detector includes a position indicator. Transmission/reception of electromagnetic waves relative to the position indicator is performed at least twice while the same loop coil is being selected. With a counter circuit and a switch circuit, a phase difference less than or equal to one cycle of a resonant frequency fO is added to a signal in each transmission/reception. The phase of a reception signal generated at the loop coil is adjusted, and the phase-adjusted signal is used as a detection clock by a synchronous detector circuit to perform synchronous detection. By computing the average or the sum of the results, external noise in the reception signals is cancelled out.

16 Claims, 9 Drawing Sheets

POSITION DETECTOR

BACKGROUND OF THE INVENTION

1. Field of the Invention

The present invention relates to position detectors for use in inputting graphics and text to computers.

2. Description of the Related Art

One type of known position detector is disclosed in Japanese Unexamined Patent Application Publication No. Kokai Sho 63-70326(U.S. Pat. No. 4,878,553).

In this position detector, electromagnetic waves are transmitted between a tablet and a position indicator, whereby coordinate values of a position indicated by the position indicator are detected. Of a plurality of loop coils which are provided in the tablet and which are parallel to position detecting directions, the loop coils are sequentially selected, and the selected loop coil emits electromagnetic waves. The electromagnetic waves which are reemitted from a resonant circuit provided in the position indicator are received, and coordinate values of the position indicated are thereby detected on the basis of a distribution of reception signal strengths.

This type of position detector is often provided as an input device for a computer and is often used with a CRT monitor which is a display. Since the CRT monitor controls electron beams by a strong magnetic field, the CRT monitor emits strong electromagnetic noise. The above-described position indicator is influenced by noise emitted from the CRT monitor, and coordinate values cannot be reliably detected.

In addition to noise from the CRT monitor, this type of position indicator may be influenced by electromagnetic waves from radio stations.

Efforts have been made to suppress the influence of external noise. In the above-described example, transmission/reception is performed multiple times for each loop coil, and averaging is performed to reduce the influence of noise. A band pass filter which preferentially receives a desired frequency component is provided as a receiving circuit.

When a frequency component included in noise from the CRT monitor and electromagnetic waves from the radio stations matches the frequency to be detected by the tablet, the foregoing methods cannot eliminate the influence of noise from the CRT monitor and electromagnetic waves from the radio stations.

SUMMARY OF THE INVENTION

Accordingly, it is an object of the present invention to provide a position detector for reliably detecting coordinate values without being influenced by noise even when a frequency component of external noise matches the frequency to be received.

In order to achieve the foregoing objects, a position detector is provided including a position indicator including a resonant circuit which includes at least a coil and a capacitor; a plurality of loop coils which are parallel to position detecting directions; and a tablet for detecting coordinate values of a position indicated by the position indicator on the basis of the levels of reception signals generated at the loop coils when electromagnetic waves at a predetermined frequency are transmitted/received relative to the position indicator. The tablet includes a transmission/reception control unit for consecutively performing transmission/reception of electromagnetic waves relative to the position indicator at least twice while the same loop coil is being selected; a phase difference control unit for controlling a phase difference of the signals in each of transmission/reception when transmission/reception of electromagnetic waves is consecutively performed at least twice; a synchronous detector circuit for detecting synchronization by using a signal obtained by controlling the phase of the reception signal generated at the loop coil as a detection clock; and a signal level processing unit for computing the average or the sum of the levels of at least two reception signals which are detected by the synchronous detection and which are based on transmission/reception of electromagnetic waves which is performed at least twice.

Arranged as described above, when transmission/reception is consecutively performed at least twice, the position detector can adjust a phase difference of signals exchanged between the position indicator and the tablet each time. When computing the average or the sum of signal levels detected by these transmission/receptions, the phase difference can be adjusted so that influence of noise can be cancelled out. Therefore, coordinates can be reliably detected without being influenced by external noise.

The phase difference control unit can be implemented by changing start timing for transmission/reception of electromagnetic waves each time, and hence the structure can be simplified.

According to the present invention, transmission/reception of electromagnetic waves relative to a position indicator is consecutively performed at least twice, and the time between the first transmission/reception and the second transmission/reception is adjusted. Thus, the polarity of noise detected in the first transmission/reception and second transmission/reception is inverted, thereby canceling out the noise. Accordingly, a position detector can be provided which is capable of reliably detecting coordinate values of a position indicated while suppressing influence of external noise which contains many frequency components at the same frequency as the resonant frequency of the position indicator, which are difficult to remove by using a known position detector.

One aspect of the invention comprises a method of detecting a position of a resonant circuit with respect to a sensor. The sensor has a plurality of loop coils for detecting coordinate values of a position indicated by a resonant circuit as a function of reception signals generated at the loop coils when electromagnetic waves are transmitted to and received from the resonant circuit. A first signal is sent from the sensor to the resonant circuit that has a frequency and a first phase angle, and a second signal is received from the resonant circuit in response to the first signal. Then a third signal is sent from the tablet to the resonant circuit that has the same frequency as the first signal but a second phase angle. A fourth signal is received from the resonant circuit in response to the third signal, and the second signal and the fourth signal are averaged to cancel noise having frequency components close to the frequency.

Another aspect of the invention comprises a method of detecting a position of a resonant circuit with respect to a sensor having a plurality of loop coils for detecting coordinate values of a position indicated by a resonant circuit as a function of reception signals generated at the plurality of loop coils when electromagnetic waves are transmitted to and received from the resonant circuit. The approximate position of the resonant circuit is detected by sending a preliminary signal to the resonant circuit from each of the plurality of loop coils, and then the strength of the signal returned by the resonant circuit in response to each of the preliminary signals is detected. A subset of the plurality of loop coils at which the signal received from the resonant circuit in response to the preliminary signal has a strength exceeding a predetermined level is selected. A first signal having a frequency and a first phase angle is sent from a selected one of the subset of the plurality of loop coils to the resonant circuit, and a second signal is received from the resonant circuit in response to the first signal. A third signal having the frequency and a second phase angle is sent from the selected one of the subset of the plurality of loop coils to the resonant circuit, and a fourth signal is received from the resonant circuit in response to the third signal. The second signal and the fourth signal are averaged to cancel noise having frequency components close to the frequency. These steps are repeated for the remaining loop coils in the subset, and the coil for which the average of the second and fourth signals satisfies a given criterion is selected.

A further aspect of the invention comprises a position detector including a position indicator having a resonant circuit and a sensor comprising a plurality of loop coils for detecting coordinate values of a position indicated by the position indicator as a function of reception signals generated at the loop coils when electromagnetic waves at a predetermined frequency are transmitted to and received from the position indicator. The sensor comprises a transmitter for sending signals having the predetermined frequency and a phase angle to the resonant circuit and a receiver for receiving signals from the resonant circuit. The sensor also includes a controller for controlling the phase angle and a processor operably associated with the receiver for computing the average of at least two out-of-phase signals transmitted by the transmitter so that noise having frequency components similar to the predetermined frequency is substantially canceled.

DESCRIPTION OF THE PREFERRED EMBODIMENTS

First Embodiment
Structure of First Embodiment

Figure 1:
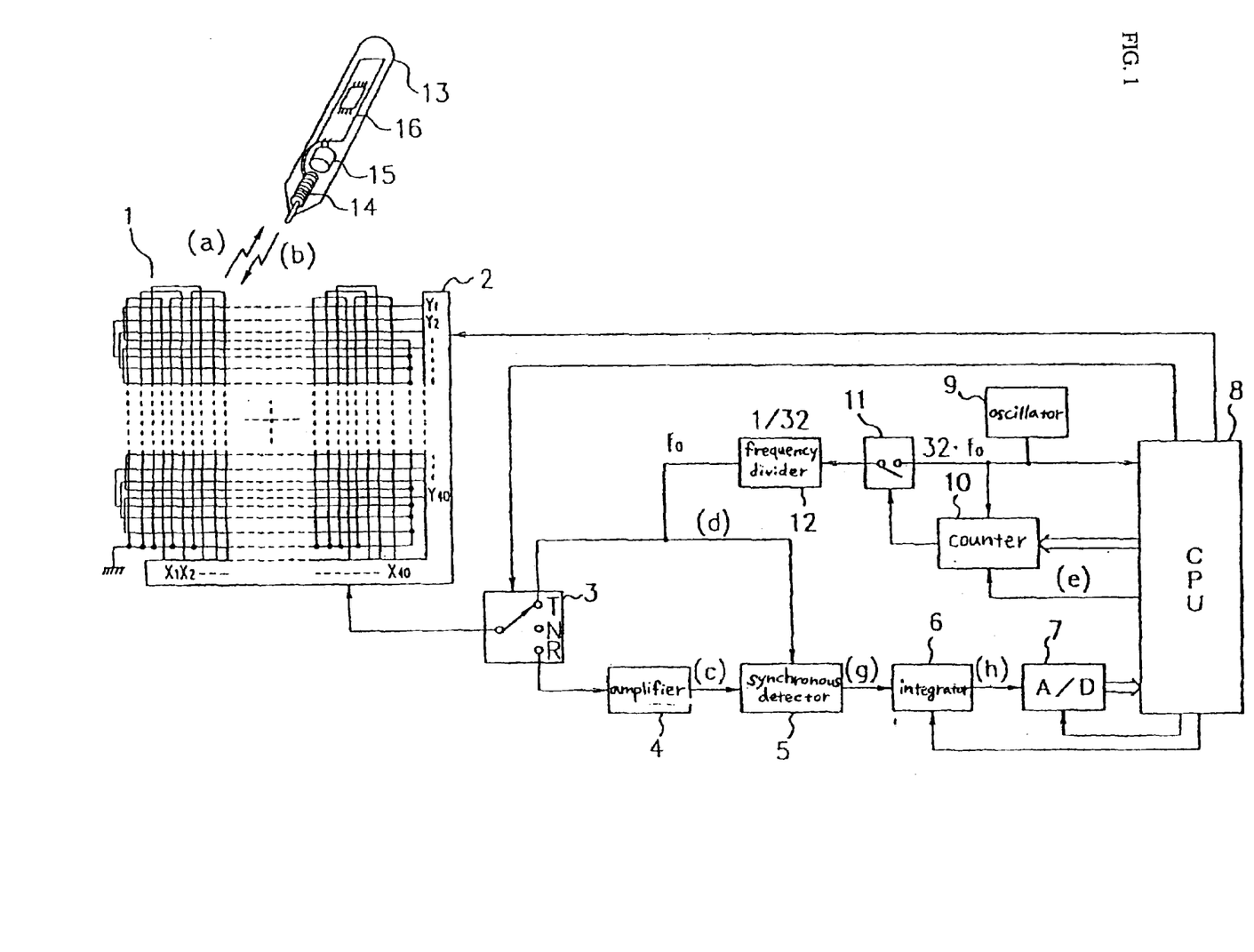
FIG. 1 is a block diagram of a position detector according to a first embodiment of the present invention.

FIG. 1 shows a position detector according to a first embodiment of the present invention.

Referring to FIG. 1, a position detector 1 includes a plurality of loop coils, which in this case are forty loop coils, namely, loop coils X1 to X40 and loop coils Y1 to Y40 which are extended in the X-axis direction and the Y-axis direction, respectively. These loop coils are connected to a selector circuit 2 which selects the loop coils one at a time.

The selector circuit 2 is connected to a transmission/reception switching circuit 3. A receiving side (R) of the transmission/reception switching circuit 3 is connected to an amplifier circuit 4, and an output of the amplifier circuit is connected to a synchronous detector circuit 5. An output of the synchronous detector circuit 5 is connected to an integrating circuit 6, and an output of the integrating circuit 6 is connected to an AD converter circuit 7. An output of the AD converter circuit 7 is connected to a CPU (central processing circuit) 8.

An oscillation circuit 9 oscillates at a frequency 32 times as high as a predetermined frequency $f_0$ to be emitted from the position detector 1. The oscillation circuit 9 is connected to the CPU 8, a counter circuit 10, and a switch circuit 11. An output of the counter circuit 10 is connected to the switch circuit 11.

An output of the switch circuit 11 is connected to a frequency divider 12 with a division ratio of 1/32. An output of the frequency divider 12 is connected to a transmitting side (T) of the transmission/reception switching circuit 3. The selected loop coil in the position detector 1 emits an alternating-current (AC) magnetic field at the frequency $f_0$. The output of the frequency divider 12 is also connected to a detection clock input terminal of the synchronous detector circuit 5.

The CPU 8 transmits various control signals (information) to the selector circuit 2, the transmission/reception switching circuit 3, the integrating circuit 6, the AD converter circuit 7, and the counter circuit 10.

These components 1 to 12 form a tablet.

Referring to FIG. 1, a position indicator 13 contains therein a coil 14, a writing force sensor 15, and a writing force detector circuit 16. The coil 14 is connected to a capacitor (not shown) to form a resonant circuit which resonates at the frequency $f_0$. The writing force detector circuit 16 is formed by an electronic circuit containing an IC. The writing force detector circuit 16 converts an analog signal from the writing force sensor 15 into a time-shared digital signal and returns the digital signal to the position detector 1 through the coil 14. Since the operation of the position indicator 13 is described in, for example, Japanese Unexamined Patent Application Publication No. Kokai Hei 5-313439(U.S. Pat. No. 5,679,930), a description thereof is omitted.

Figure 2:
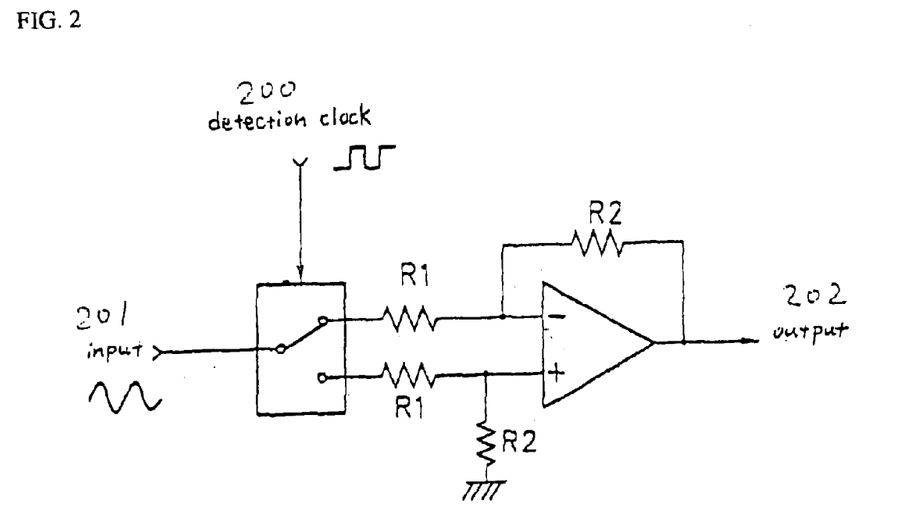
FIG. 2 is a circuit diagram of an example of the specific structure of a synchronous detector circuit.
Figure 3:
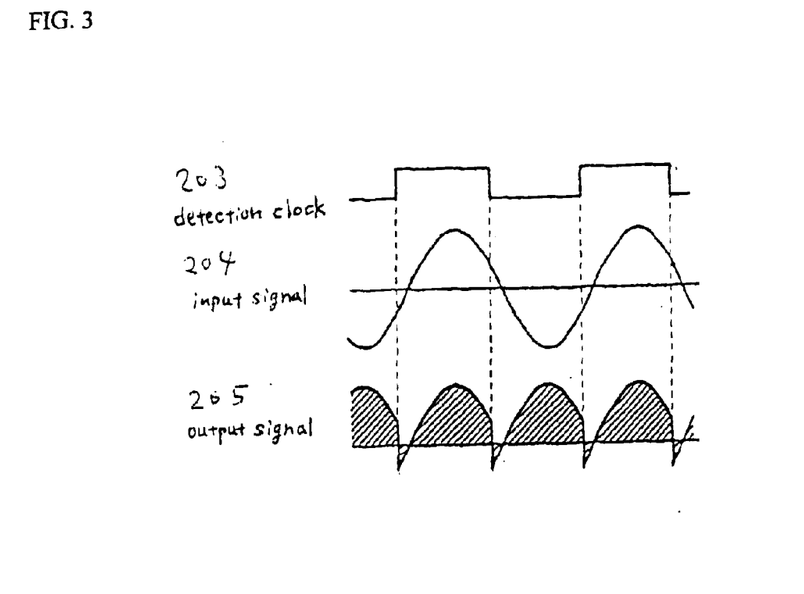
FIG. 3 includes waveform diagrams showing the operation of the synchronous detector circuit shown in FIG. 2.

FIG. 2 shows an example of the specific structure of the synchronous detector circuit 5. The synchronous detector circuit 5 is a known circuit which includes an analog switch, an operational amplifier and resistors (R1 and R2). FIG. 3 includes waveform diagrams showing the operation of the synchronous detector circuit 5 shown in FIG. 2. As shown in FIGS. 2 and 3, a detection clock is identified as 200, with input signal 201 and output signal 202. At a positive half cycle of a detection clock, an input signal is not inverted and is output. At a negative half cycle, an input signal is inverted and is output. Integration of output signals for a predetermined period of time allows a target frequency component, that is, a frequency component of a detection clock, to be exclusively extracted.

Figure 4:
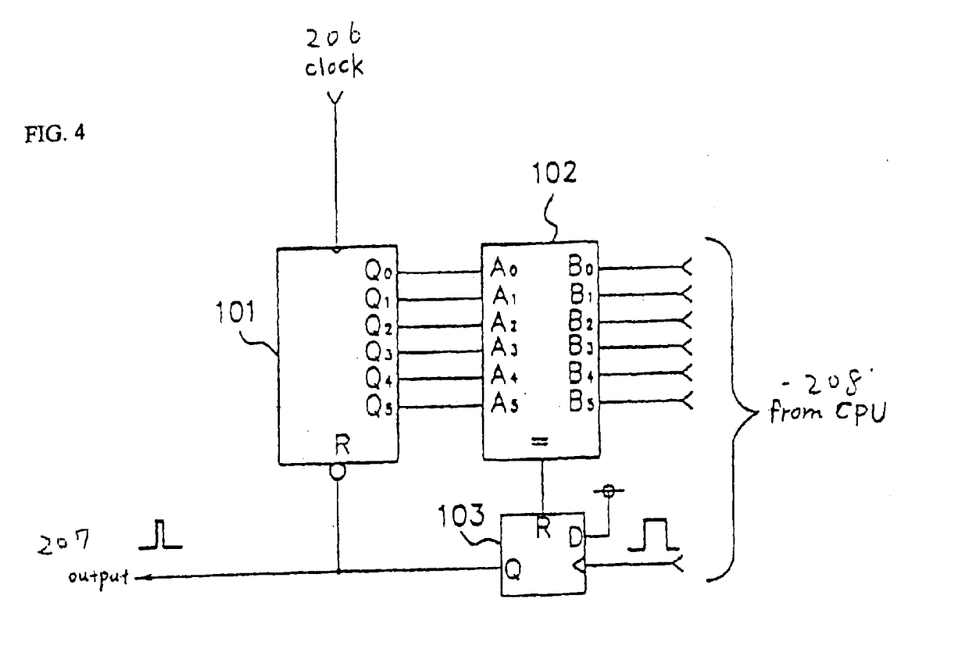
FIG. 4 is a circuit diagram of an example of the specific structure of a counter circuit.

As shown in FIG. 4, a clock is identified as 20206, either input 208 from CPU 8, and output 207. FIG. 4 shows an example of the specific structure of the counter circuit 10. Referring to FIG. 4, the counter circuit 10 includes a counter 101, a comparator 102, and a flip flop 103.

A clock terminal of the counter 101 is connected to the oscillation circuit 9. Output terminals $Q_0$ to $Q_5$ are connected to input terminals $A_0$ to $A_5$, respectively, of the comparator 102. Input terminals $B_0$ to $B_5$ of the comparator 102 are connected to the CPU 8, and an output terminal of the comparator 102 is connected to a reset terminal of the flip flop 103. A clock terminal of the flip flop 103 is connected to the CPU 8. A D terminal of the flip flop 103 is connected to a power supply (high level). A Q output terminal of the flip flop 103 is connected to a reset terminal of the counter 101 and the switch circuit 11.

Arranged as described above, when a trigger pulse from the CPU 8 enters the flip flop 103, the output terminal Q rises at a rising edge of the trigger pulse, and the counter 101 starts counting oscillation signals of the oscillation circuit 9. For the input terminals $B_0$ to $B_5$ of the comparator 102, predetermined values are input/set by the CPU 8. When these values match a counter value of the counter 101, the output terminal of the comparator 102 rises. At the same time, the flip flop 103 is reset. Thus, the Q output of the flip flop 103, that is, the output of the counter circuit 10, is a pulsed signal with a pulse duration corresponding to time in which oscillation signals from the oscillation circuit 9 are counted (the number of oscillation signals counted is a value set by the CPU 8 and ranges from 0 to 31).

Operation of First Embodiment

As in a known position detector, overall scanning is performed to roughly detect a position at which the position indicator 13 is placed on the position detector 1.

Overall scanning is performed in the following manner: All of the forty loop coils in the X-axis direction and the Y-axis direction are selected one at a time, and electromagnetic waves are transmitted/received. It is checked whether a signal level greater than or equal to a predetermined value is received. A loop coil which generates a signal with the highest signal level (hereinafter referred to as a peak coil) is detected.

Since overall scanning is intended to detect for the first time the approximate position at which the position indicator 13 is placed, influence of external noise is a minor problem. During overall scanning, the CPU a controls the counter circuit 10 so that the switch circuit 11 is always turned ON. Specifically, no trigger pulses are supplied to the counter circuit 10.

The operation subsequent to detecting the approximate position of the position indicator 13 by the foregoing overall scanning will now be described.

Figure 5:
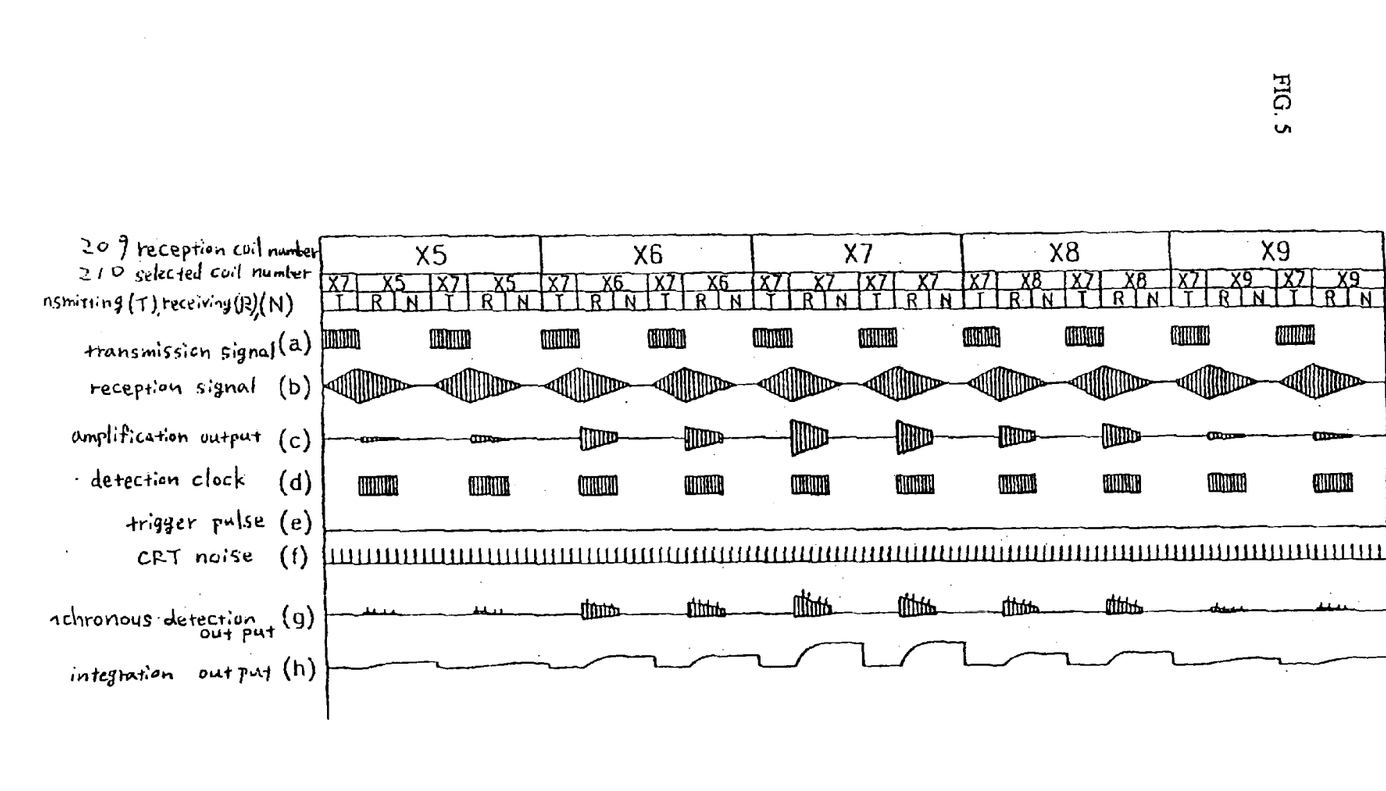
FIG. 5 includes waveform diagrams showing the operation at portions when partial scanning is performed in the first embodiment.
Figure 6:
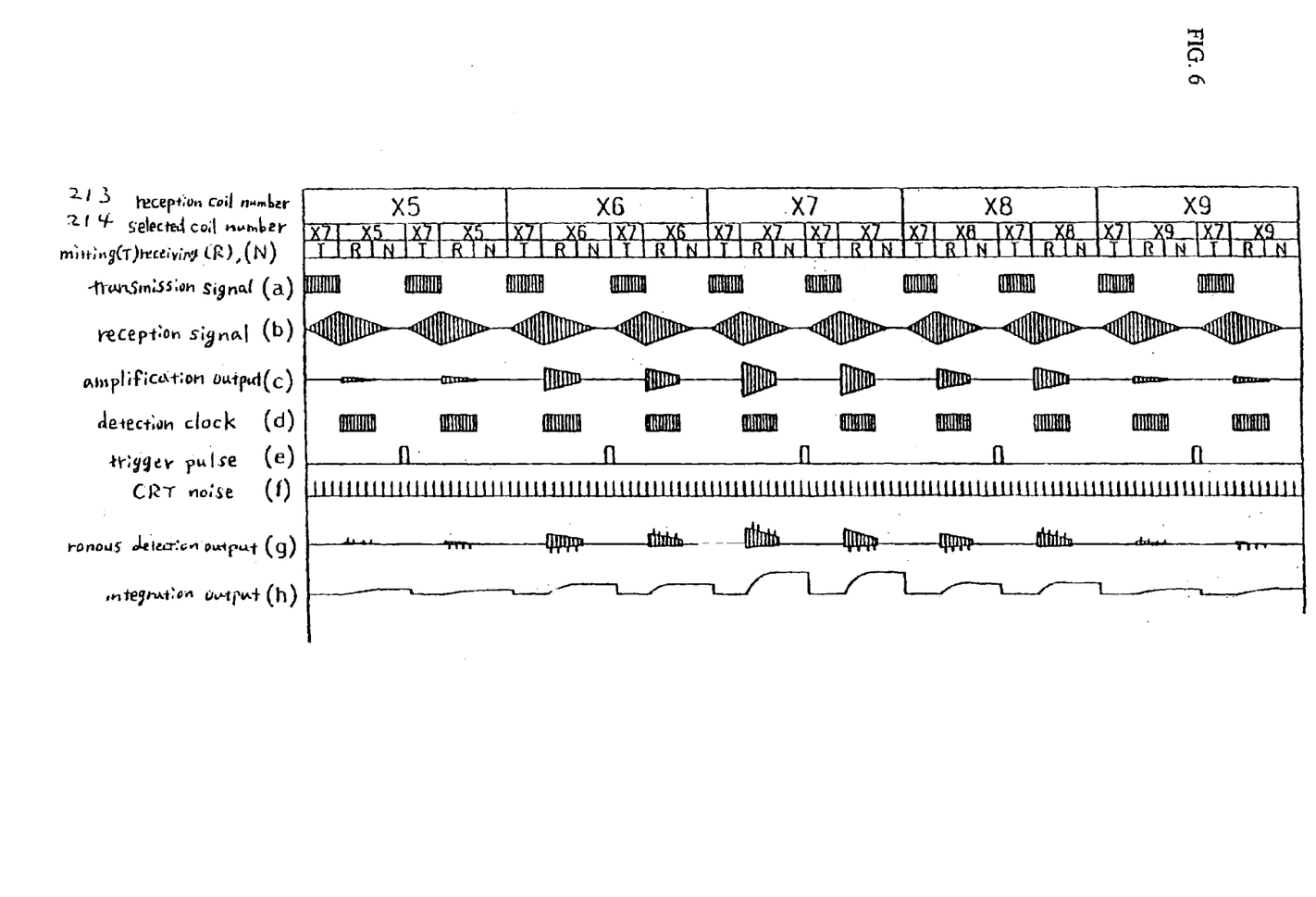
FIG. 6 includes other waveform diagrams showing the operation at portions when partial scanning is performed in the first embodiment.

FIGS. 5 and 6 each show signal waveforms at portions when partial scanning is performed in the first embodiment. For purposes of the description, similar to the case in which overall scanning is performed, FIG. 5 includes waveform diagrams in which no trigger pulses are supplied to the counter circuit 10 and the switch circuit 11 remains the ON state, whereby inherent effects are not produced. FIG. 6 includes waveform diagrams showing the actual operation of the present invention.

Referring to FIGS. 5 and 6, reception coil number is indicated in rows 209 and 211, and selected coil number is indicated in rows 210 and 212, respectively. Trace denotes a transmission signal from a loop coil in the position detector 1; trace b denotes a reception signal from the position indicator 13; trace c denotes an output signal from the amplifier circuit 4; trace d denotes a detection clock signal to be supplied to the synchronous detector circuit 5; trace e denotes a trigger pulse to be input from the CPU 8 to the counter circuit 10; trace f denotes noise which is emitted from the CRT monitor and which includes many frequency $f_0$ components; trace g denotes an output signal of the synchronous detector circuit 5; and trace h denotes an output signal of the integrating circuit 6. The signals denoted by traces a to h (excluding f) correspond to (a) to (h), respectively, in FIG. 1.

FIGS. 5 and 6 shows a case in which the position indicator 13 is placed near the loop coil X7 and partial scanning in the X direction is performed. As described below, the CPU 8 selects five loop coils X5 to X9 around the loop coil X7 one at a time and detects the level of a signal from the position indicator 13 for each loop coil. For each loop coil, transmission/reception is performed twice, and two signal levels (output values of the AD converter circuit 7) are averaged to compute a coordinate.

Single transmission/reception is performed by three operation steps (periods).

The CPU 8 causes the selector circuit 2 to select the loop coil X7 and causes the transmission/reception switching circuit 3 to be switched to the transmitting side (T). Thus, the loop coil X7 emits a signal at the frequency $f_0$ to the position indicator 13.

The CPU 8 causes the selector circuit 2 to select the loop coil X5 and causes the transmission/reception switching circuit 3 to be switched to the receiving side (R). Thus, the signal from the position indicator 13 is detected at the loop coil X5, and the detected signal is input to the integrating circuit 6 through the synchronous detector circuit 5.

The CPU 8 causes the transmission/reception switching circuit 3 to be switched to a side (N) which is neither the transmitting side nor the receiving side. Thus, signals from the position indicator 13 will not be input to the integrating circuit 6. The integrating circuit 6 holds a constant output value. In the meantime, the CPU 8 activates the AD converter circuit 7 and reads an output value from the AD converter circuit 7 as a signal level.

Similarly, the CPU 8 selects the loop coil X7 in transmission and selects the loop coil X5 in reception, whereby transmission/reception is performed once more. Thus, the signal level detection relative to the loop coil X5 is completed.

For the loop coils X6 to X9, the CPU 8 performs similar operations to detect signal levels. Subsequent to partial scanning in the X direction, the CPU 8 performs similar operations (partial scanning in the Y direction) for five Y-direction loop coils around a Y-direction peak coil (descriptions thereof are omitted).

Noise from the CRT monitor contains many frequency $f_0$ components. In the case shown in FIG. 5, the detection output signal g contains noise pulses as shown in the diagram. The noise pulses are integrated by the integrating circuit 6, and this influences each signal level to be detected. Thus, the position indicated by the position indicator 13 cannot be accurately detected.

Referring to FIG. 6, the actual operation of the present invention, that is, partial scanning when the trigger pulse e is supplied from the CPU 8 to the counter circuit 10, will now be described.

Referring to FIG. 6, when the first transmission/reception for each loop coil is completed, the transmission/reception switching circuit 3 is switched to N. In this state, the CPU 8 sets an optimal value which is preset to the counter circuit 10, and outputs a trigger pulse to the counter circuit 10.

As described with reference to FIG. 4, in response to the trigger pulse, the counter circuit 10 outputs a pulsed signal with a pulse duration corresponding to the number of clocks, which is the above-described preset value. The pulsed signal is input to the switch circuit 11. For the pulse duration, the switch circuit 11 is OFF, and the frequency divider 12 is deactivated. Specifically, a slight delay which corresponds to the pulse duration is caused between the first transmission/reception and the second transmission/reception.

Since the delay time corresponds to the number of clocks from the oscillation circuit 9, which are counted within the range of 0 to 31, the delay time is within the range of one cycle of the frequency $f_0$. This operation constitutes a feature of the present invention.

The optimal value set by the CPU 8 to the counter circuit 10 may be provided as a value which causes the phase relationship between the CRT noise e and the detection clock d in the first transmission/reception to become opposite that in the second transmission/reception. As a result, the polarity of CRT noise detected in the output of the synchronous detector circuit 5 in the first transmission/reception becomes opposite that of the second transmission/reception. Computation of the average or the sum of output values of the AD converter circuit 7 based on the output of the synchronous detector circuit 5 cancels out the influence of the CRT noise, and hence coordinate values can be accurately detected.

Figure 7:
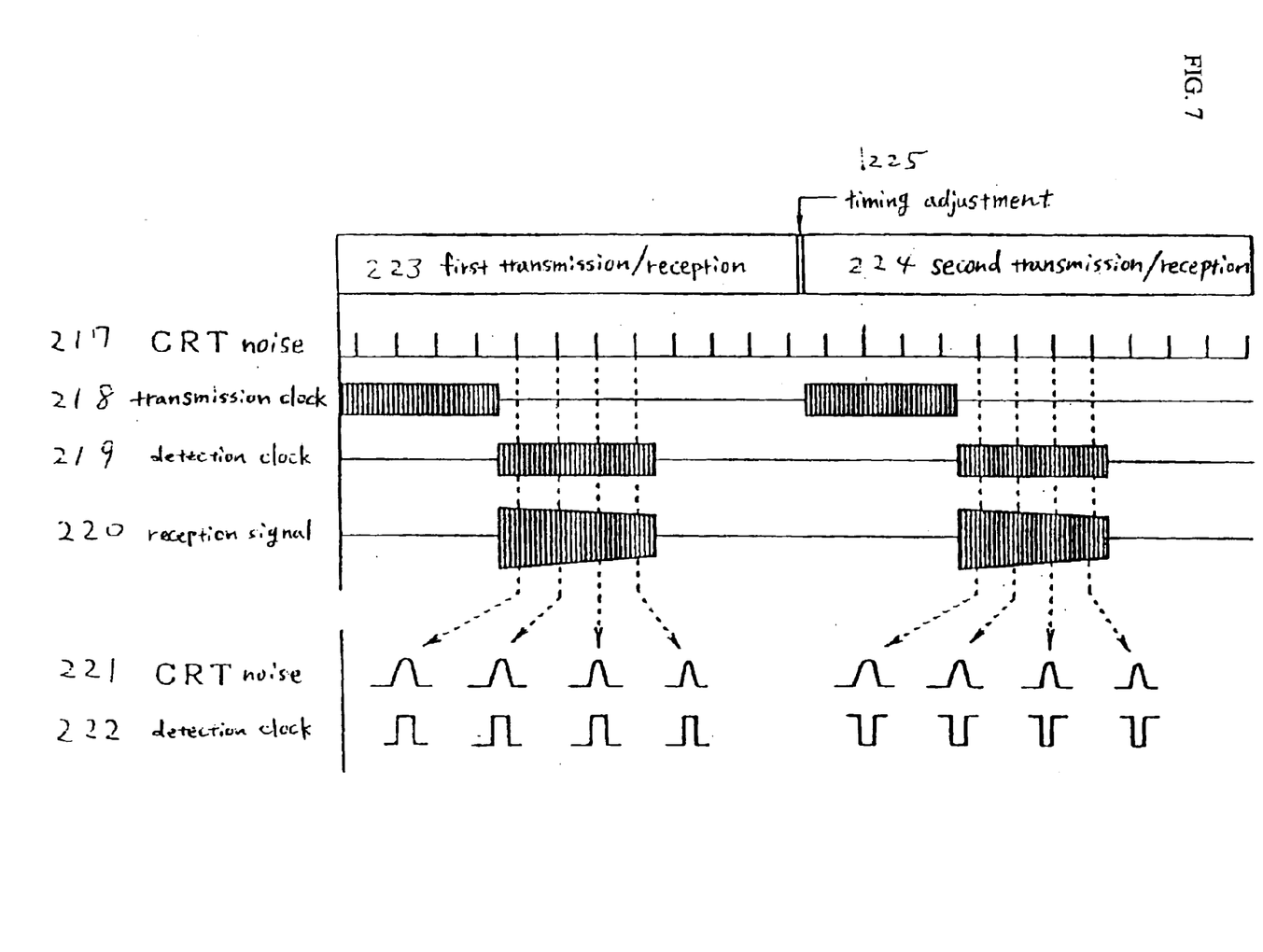
FIG. 7 illustrates the principle of noise cancellation in the first embodiment.

FIG. 7 shows the principle of canceling out the influence of noise, wherein the following reference numerals are provided d: CRT noise 217; transmission clock 218; detection clock 219; reception signal 220; CRT noise 221; and detection clock 222. By adjusting the time between the first transmission/reception and the second transmission/reception, the influence of noise is cancelled out.

Figure 8:
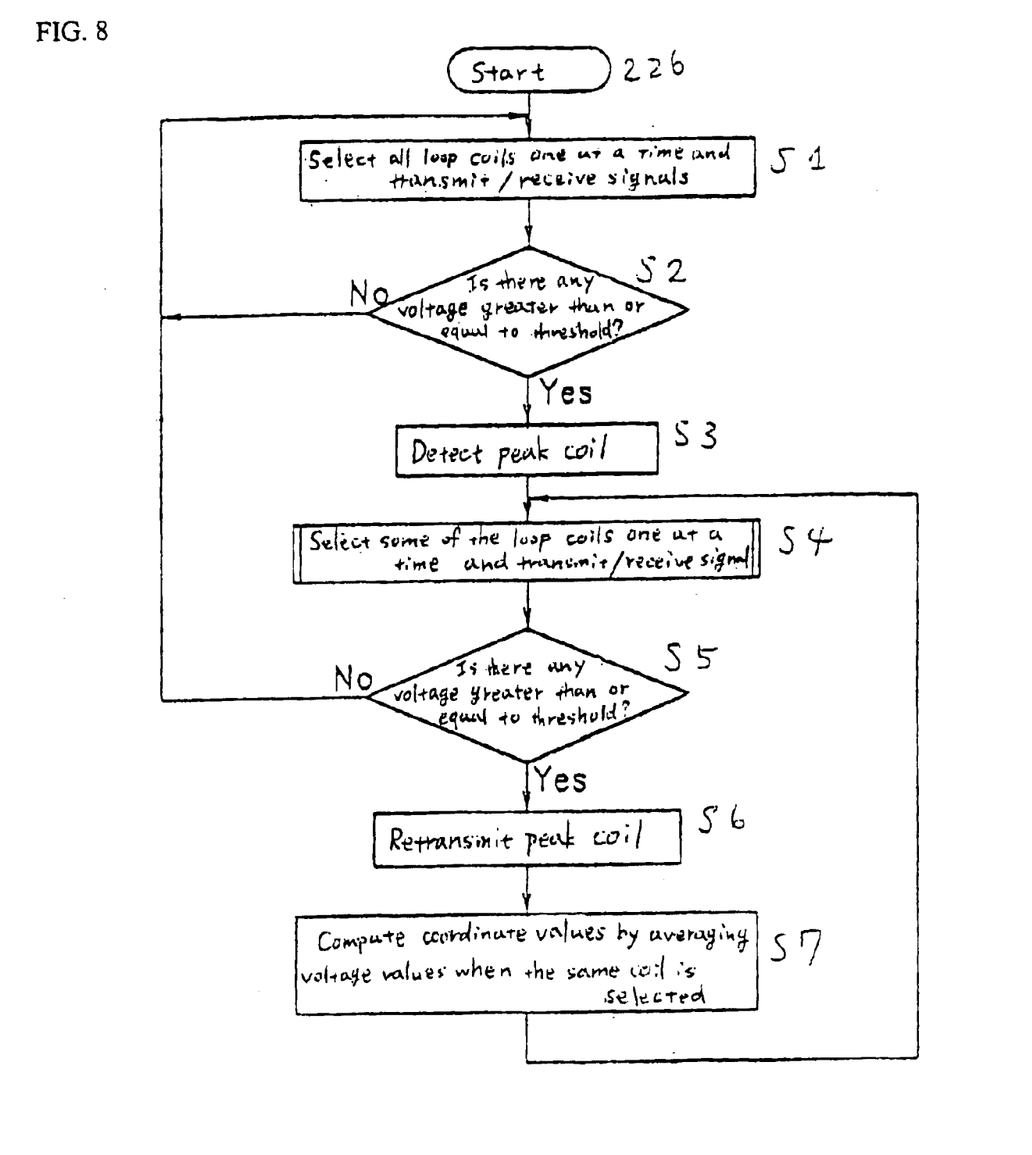
FIG. 8 is a flowchart showing a process of detecting a position in the first embodiment.

FIG. 8 shows an overall process of detecting a position in the first embodiment. Scanning is started 226. All of the forty loop coils in the X-axis direction and the Y-axis direction are selected one at a time, and electromagnetic waves are transmitted/received (S1). It is checked whether a signal level greater than or equal to a predetermined value is received (S2). A loop coil which generates a signal with the highest signal level (hereinafter referred to as a peak coil) is detected (S3). Next, some of the loop coils in the X-axis direction and the Y-axis direction are selected one at a time, and electromagnetic waves are transmitted/received (S4). It is checked whether a signal level greater than or equal to a predetermined value is received (S5). The peak coil is retransmitted (S6). Coordinate values are computed by averaging voltage values when the same coil is selected (S7).

Figure 9:
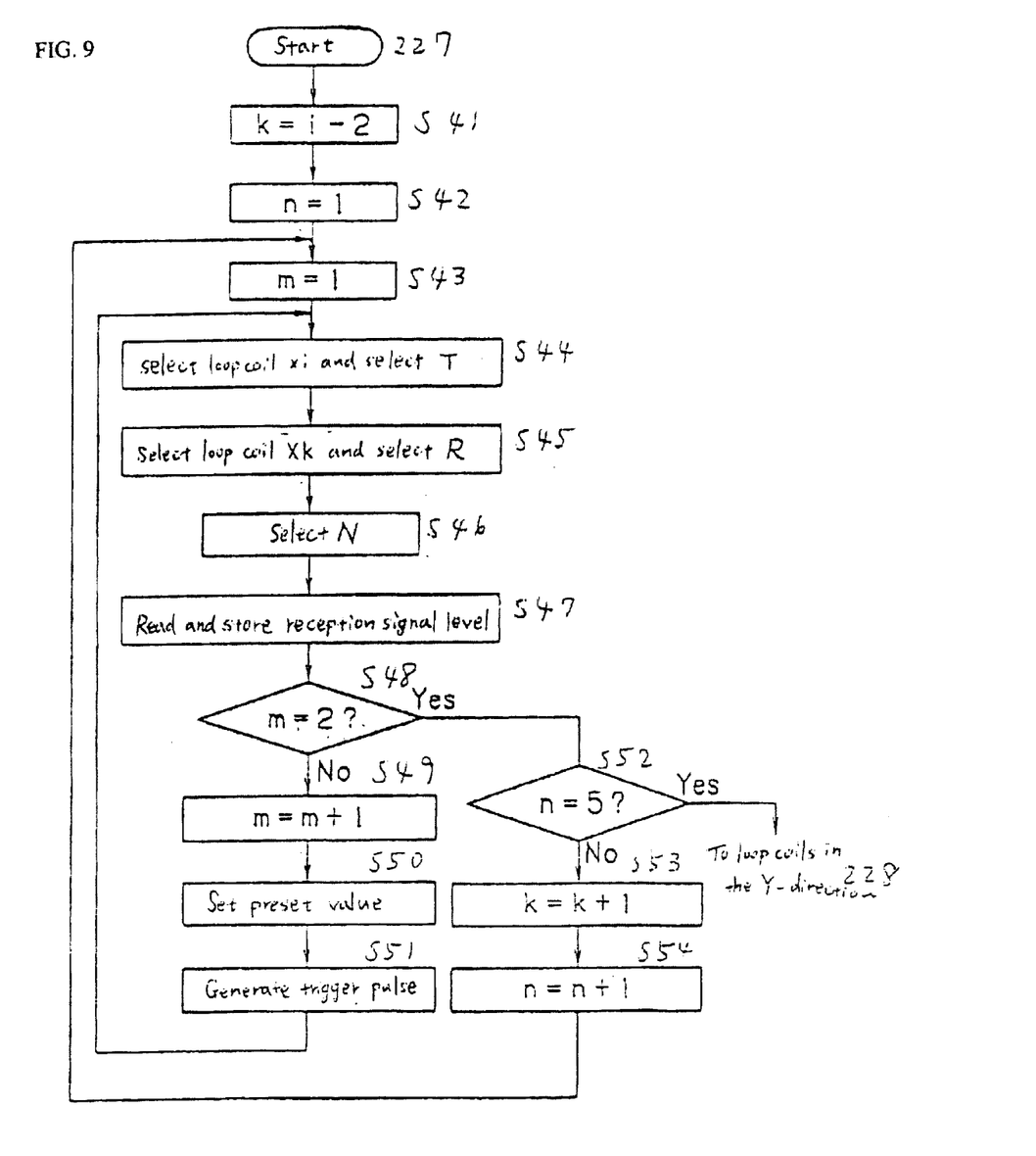
FIG. 9 is a flowchart showing a process of selecting some of loop coils and transmitting/receiving a signal, which is shown in FIG. 8.

FIG. 9 shows a partial process of the process shown in FIG. 8. FIG. 9 illustrates a process of selecting some of the loop coils one at a time and transmitting/receiving signals. (Since the operation in the Y direction is similar to that in the X direction, a description of the operation in the Y direction is omitted). Referring to FIG. 9, i denotes a loop coil number selected in transmission (peak coil); k denotes a loop coil number selected in reception; m denotes the number of times transmission/reception is performed when the same reception coil is selected; and n denotes the number of times transmission/reception is performed when the reception coil is changed.

The process for X-axis is started at 227. The loop coil number selected in reception equals the loop coil number selected in transmission, minus 2 (S41). The transmission/reception is performed once when the reception coil is changed (S42), and once when the reception coil is selected (S43). Loop coil xi is selected, and the transmitting side T is selected (S44). Next, loop coil xk is selected and the receiving side R is selected (S45). Next, a side N which is neither T nor R is selected (S46). The reception signal is read and stored (S47). It is determined if m=2 (S48).

If no, m=m+1 (S49), a preset value is set (S50), and a trigger pulse is generated (S51). The process then reverts back to step S44.

If yes, it is determined if n=5 (S52). If no, k=k+1 (S53), and n=n+1 (S54). The process then reverts back to step S43. If no, the loop coils in the Y-axis direction are determined at 228.

Extended First Operation

Although the timing is adjusted by counting clocks in the first embodiment, the timing can be adjusted by other methods. Although the analog switch is used as the synchronous detector circuit 5 to change the polarity, an analog multiplier or the like can be used instead.

Although counting is performed by counting clocks at a frequency 32 times as high as the transmission frequency $f_0$ in the first embodiment, the present invention is not limited to the first embodiment. Alternatively, clocks at a different frequency can be employed.

Although advantages of the first embodiment in a case in which external noise is CRT noise have been described, influence of radio waves can be cancelled out according to exactly the same principle as the above-described principle even in the vicinity of a radio station that transmits radio waves at a frequency near the frequency $f_0$. In other cases in which the source of noise is known in advance, influence of noise which contains a large number of frequency $f_0$ components can be cancelled out.

Although the timing has only been adjusted after the first transmission/reception in the first embodiment, the timing can be adjusted subsequent to both the first transmission/reception and the second transmission/reception.

Although transmission/reception is performed twice for each loop coil and the average of the two results is computed in the first embodiment, transmission/reception can be performed four times and the average of the four results can be computed instead. In the latter case, the timing adjustment can be performed after the first transmission/reception and after the third transmission/reception. Alternatively, the timing adjustment can be performed subsequent to each transmission/reception.

In the first embodiment, the length of time between the first transmission/reception and the second transmission/reception is adjusted to a predetermined value. Alternatively, all preset values can be tested when the power is turned ON, and a value in which the influence of noise is reduced to a minimum can be automatically computed and employed for the timing adjustment.

Second Embodiment

Structure of Second Embodiment

Figure 10:
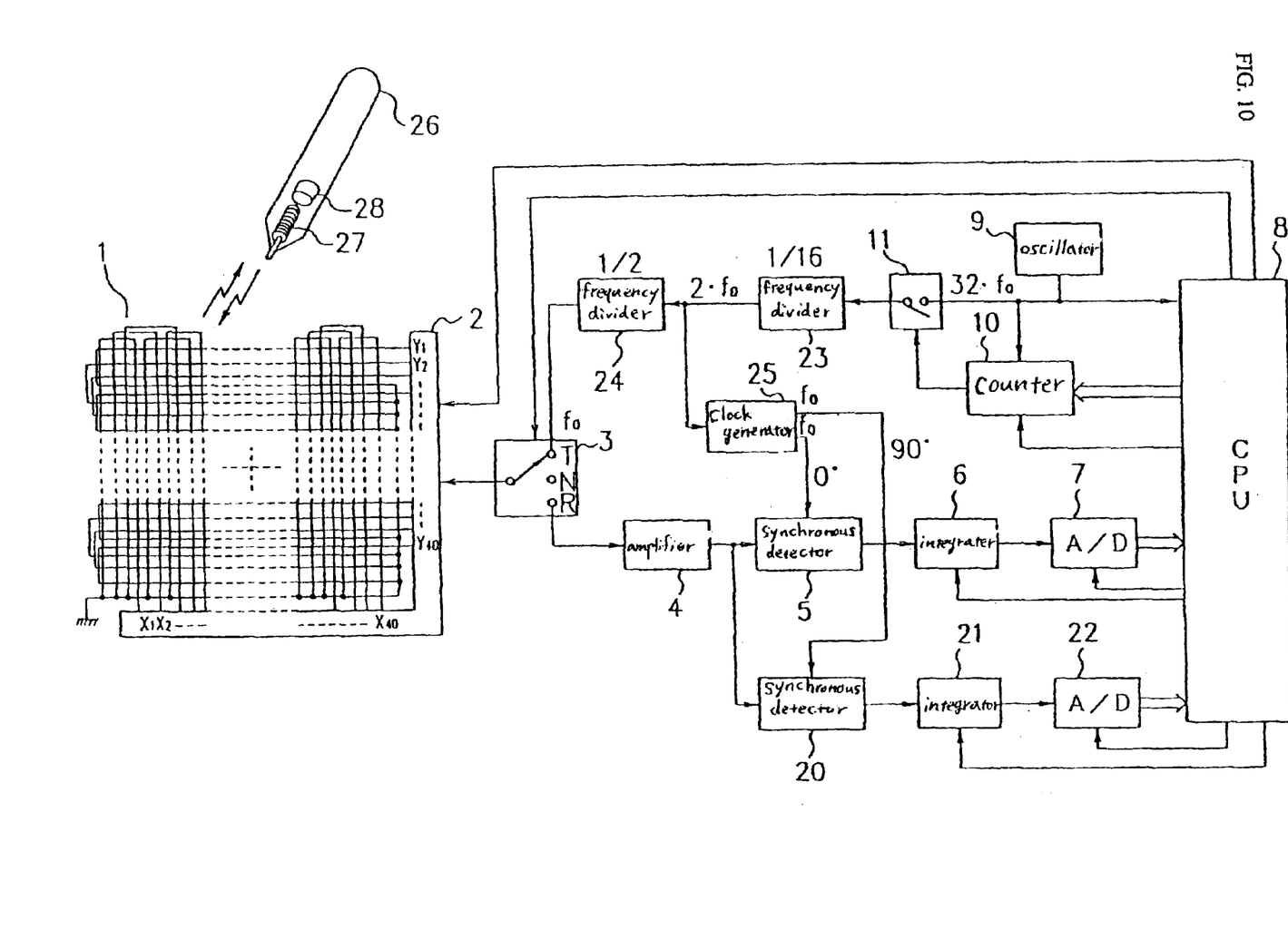
FIG. 10 is a block diagram of a position detector according to a second embodiment of the present invention.

FIG. 10 shows a position detector according to a second embodiment of the present invention. Referring to FIG. 10, the same reference numerals are given to components corresponding to those in the first embodiment.

The structure of the position detector of the second embodiment differs from that of the first embodiment in that two receiving systems (from synchronous detector circuits to AD converter circuits) are provided and in that detection clocks which are out of phase by 90 degrees are supplied to the respective synchronous detector circuits.

Specifically, referring to FIG. 10, an input of a synchronous detector circuit 20 is connected to the output of the amplifier circuit 4, and an output of the synchronous detector circuit 20 is connected to an integrating circuit 21. An output of the integrating circuit 21 is connected to an AD converter circuit 22. An output of the AD converter circuit 22 is connected to the CPU 8.

A frequency divider 23 has a division ratio of 1/16. An input of the frequency divider 23 is connected to the output of the switch circuit 11, and an output of the frequency divider 23 is connected a frequency divider 24 with a division ratio of 1/2 and to a clock generating circuit 25. An output of the frequency divider 24 is connected to the transmitting side (T) of the transmission/reception switching circuit 3. As in the first embodiment, the frequency divider 24 supplies a signal at the frequency $f_0$ to the position detector 1.

From a signal at a frequency two times as high as the frequency $f_0$, the clock generating circuit 25 generates two clock signals which are at the frequency $f_0$ and which are out of phase by 90 degrees and supplies the two clock signals as detection clocks to the synchronous detector circuits 5 and 20, respectively.

The components 1 to 11 and the components 20 to 25 form the tablet.

With continued reference to FIG. 10, a position indicator 26 contains therein a coil 27, a capacitor (not shown) which is connected to the coil 27 to resonate at the frequency $f_0$, and a variable capacitor 28 whose electrostatic capacitance varies in accordance with the writing force. The variable capacitor 28 is also connected to the coil 27. The variable capacitor 28 is designed such that the resonant frequency slightly varies in accordance with the writing force.

Operation of Second Embodiment

In the second embodiment, the phase of a received signal varies in accordance with the writing force. The foregoing two receiving systems detect the respective signal levels. From the ratio between the two signal levels, the phase angle of the two signals is computed, and the writing force applied to the position indicator 26 is thereby computed. Since these operations are disclosed in the application publications described in the related art and their related applications, descriptions thereof are omitted.

The second embodiment is similar to the first embodiment in that overall scanning is performed at the beginning to detect an approximate position of the position indicator, which is followed by partial scanning. The second embodiment differs from the first embodiment in that a second system including a synchronous detection output and an integration output is provided in addition to those shown in FIG. 6.

In the second embodiment, an optimal value which is preset by the CPU to the counter circuit 10 is set, and, as in the first embodiment, a trigger pulse is output. Accordingly, the counter circuit 10 outputs a pulsed signal which has a pulse duration corresponding to the number of clocks, the number of clocks being preset. The pulsed signal is input to the switch circuit 11. For the pulse duration, the switch circuit 11 is OFF, and the frequency dividers 23 and 24 are deactivated. Specifically, a slight delay which corresponds to the pulse duration is caused between the first transmission/reception and the second transmission/reception.

As in the first embodiment, since the phase relationship between the CRT noise and the detection clock in the first transmission/reception becomes opposite that in the second transmission/reception, the polarity of CRT noise detected in the outputs of the synchronous detector circuits 5 and 20 in the first transmission/reception becomes opposite that of the second transmission/reception.

By computing the average or the sum of output values of the AD converter circuits 7 and 22 based on the outputs of the synchronous detector circuits 5 and 20, the influence of the CRT noise can be cancelled out, and coordinate values and a phase angle of reception signals can be accurately computed.

The flow of an overall position detecting process and the flow of a partial process of the overall process in which some of the loop coils are selected one at a time and signals are transmitted/received are basically the same as those in the first embodiment.

Extended Second Embodiment

Although the timing adjustment has been performed by counting clocks in the second embodiment, other methods can be employed instead. Although analog switches have been used as synchronous detector circuits to change the polarity in the second embodiment, analog multipliers or the like can be used instead.

Although advantages of the second embodiment in a case in which external noise is CRT noise have been described, the influence of radio waves can be cancelled out according to exactly the same principle as the above-described principle even in the vicinity of a radio station that transmits radio waves at a frequency near the frequency $f_0$. In other cases in which the source of noise is known in advance, the influence of noise which contains a large number of frequency $f_0$ components can be cancelled out.

Although the timing has only been adjusted after the first transmission/reception in the second embodiment, the timing can be adjusted subsequent to both the first transmission/reception and the second transmission/reception.

Although transmission/reception is performed twice for each loop coil and the average of the two results is computed in the first embodiment, transmission/reception can be performed four times and the average of the four results can be computed instead. In the latter case, the timing adjustment can be performed after the first transmission/reception and after the third transmission/reception. Alternatively, the timing adjustment can be performed subsequent to each transmission/reception.

In the second embodiment, the length of time between the first transmission/reception and the second transmission/reception is adjusted to a predetermined value.

Alternatively, all preset values can be tested when the power is turned on, and a value in which the influence of noise is reduced to a minimum can be automatically computed and employed for the timing adjustment.

What is claimed is:

1. A position detector comprising:
   a position indicator comprising a resonant circuit which includes at least a coil and a capacitor;
   a plurality of loop coils which are parallel to position detecting directions; and
   a tablet for detecting coordinate values of a position indicated by the position indicator on the basis of the levels of reception signals generated at the loop coils when electromagnetic waves at a predetermined frequency are transmitted/received relative to the position indicator;
   wherein the tablet comprises:
   transmission/reception control means for consecutively performing transmission/reception of electromagnetic waves relative to the position indicator at least twice while the same loop coil is being selected;
   phase difference control means for controlling a phase difference of the signals in each of transmission/reception when transmission/reception of electromagnetic waves is consecutively performed at least twice;
   a synchronous detector circuit for detecting synchronization by using a signal obtained by controlling the phase of the reception signal generated at the loop coil as a detection clock; and
   signal level processing means for computing the average or the sum of the levels of at least two reception signals which are detected by the synchronous detection and which are based on transmission/reception of electromagnetic waves which is performed at least twice.

2. A position detector according to claim 1, wherein the phase difference control means changes the start timing of transmission/reception of electromagnetic waves every time.

3. A method of detecting a position of a resonant circuit with respect to a sensor comprising the steps of:
   providing a sensor having a plurality of loop coils for detecting coordinate values of a position indicated by a resonant circuit as a function of reception signals generated at the loop coils when electromagnetic waves are transmitted to and received from the resonant circuit;

sending a first signal from the sensor to the resonant circuit, said first signal having a frequency and a first phase angle;

receiving a second signal from said resonant circuit in response to said first signal;

sending a third signal from the sensor to the resonant circuit, said third signal having the frequency and a second phase angle;

receiving a fourth signal from the resonant circuit in response to said third signal; and averaging said second signal and said fourth signal to cancel noise having frequency components close to said frequency.

4. The method of claim 3 including the additional step of, before sending said first signal, detecting the approximate position of the resonant circuit by sending a preliminary signal to said resonant circuit from each of the plurality of loop coils and detecting the strength of the signal returned by the resonant circuit in response to each of the preliminary signals.

5. The method of claim 4 wherein the step of sending said first signal comprises the step of sending said first signal only from loop coils that received signals having a strength greater than a given level in response to said preliminary signals.

6. A method of detecting a position of a resonant circuit with respect to a sensor comprising the steps of:

a) providing a sensor having a plurality of loop coils for detecting coordinate values of a position indicated by a resonant circuit as a function of reception signals generated at the plurality of loop coils when electromagnetic waves are transmitted to and received from the resonant circuit;

b) detecting the approximate position of the resonant circuit by sending a preliminary signal to said resonant circuit from each of the plurality of loop coils and detecting the strength of the signal returned by the resonant circuit in response to each of the preliminary signals;

c) selecting a subset of the plurality of loop coils at which the signal received from the resonant circuit in response to the preliminary signal has a strength exceeding a predetermined level;

d) sending a first signal from a selected one of the subset of the plurality of loop coils to the resonant circuit, said first signal having a frequency and a first phase angle;

e) receiving a second signal from said resonant circuit in response to said first signal;

f) sending a third signal from the selected one of the subset of the plurality of loop coils to the resonant circuit, said third signal having the frequency and a second phase angle;

g) receiving a fourth signal from the resonant circuit in response to said third signal; and h) averaging said second signal and said fourth signal to cancel noise having frequency components close to said frequency;

i) repeating steps d through h for each of the remaining loop coils in said subset of loop coils; and j) identifying a loop coil from said subset of loop coils for which the average of said second signal and said fourth signal satisfies a given criterion.

7. A position detector comprising:

a position indicator including a resonant circuit;

a sensor comprising a plurality of loop coils for detecting coordinate values of a position indicated by the position indicator as a function of reception signals generated at the loop coils when electromagnetic waves at a predetermined frequency are transmitted to and received from the position indicator;

wherein the sensor comprises:

a transmitter for sending signals having the predetermined frequency and a phase angle to said resonant circuit;

a receiver for receiving signals from said resonant circuit;

a controller for controlling said phase angle; and a processor operably associated with said receiver for computing the average of at least two out-of-phase signals transmitted by said transmitter so that noise having frequency components similar to the predetermined frequency is substantially canceled.

8. The position detector of claim 7 wherein said controller includes an oscillator and a frequency divider.

9. The position detector of claim 8 wherein said controller includes a counter operably connected to said oscillator.

10. The position detector of claim 9 including a switch connected between said oscillator and said frequency divider and operably connected to said counter.

11. The position detector of claim 9 wherein said counter includes a comparator and a flip flop.

12. The position detector of claim 7 wherein said sensor comprises a tablet.

13. The position detector of claim 7 wherein said resonant circuit comprises a stylus.

14. The position detector of claim 13 wherein said stylus includes an integrated circuit.

15. The position detector of claim 7 wherein said receiver includes a synchronous detector.

16. The position detector of claim 15 wherein said frequency divider is connected to said synchronous detector.

* * * * *